United States Patent
Körner et al.

(10) Patent No.: US 6,629,369 B1
(45) Date of Patent: *Oct. 7, 2003

(54) METHOD FOR MOUNTING A TRANSMISSION UNIT

(75) Inventors: Tillmann Körner, Zang (DE); Achim Paul Schieder, Krummennaab (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/601,163

(22) PCT Filed: Dec. 2, 1999

(86) PCT No.: PCT/EP99/09391

§ 371 (c)(1),
(2), (4) Date: Oct. 3, 2000

(87) PCT Pub. No.: WO00/32964

PCT Pub. Date: Jun. 8, 2000

(30) Foreign Application Priority Data

Dec. 3, 1998 (DE) .......................... 198 55 763

(51) Int. Cl.[7] ............................... B23P 15/14
(52) U.S. Cl. ..................... 29/893.1; 29/893.2
(58) Field of Search ............... 29/893.1, 893.2, 29/893; 74/606 R

(56) References Cited

U.S. PATENT DOCUMENTS

| | | | |
|---|---|---|---|
| 3,475,992 A | 11/1969 | West, Jr. et al. .......... | 74/759 |
| 4,444,071 A | * 4/1984 | Guichard .................. | 29/893.1 |
| 5,653,321 A | 8/1997 | Takaoka et al. .......... | 192/70.17 |
| 6,435,057 B1 | * 8/2002 | Korner et al. ............ | 74/606 R |

FOREIGN PATENT DOCUMENTS

| EP | 0 757 189 | 2/1997 |
|---|---|---|
| GB | 1 411 361 | 10/1975 |

OTHER PUBLICATIONS

G. Nitescu, "Four–Speed Planetary Gearbox for Passenger Vehicles with Hydrodynamic Torque Converter as Power Dividers," Automobil–Industrie May 1985.

M. Buchksch, ZF–5–Speed Automatic Transmission for Passenger Vehicles (5HP 18).

W. Klement, "Development of the Voith–DIWA Transmission".

M. Bucksch, "ZF–5–Gang–Automatgetriebe fur PKW (5HP 18)"; VDI Berichte NR. 878,1991, Seiten 189–200.

G. Nitescu, "Viergangplanetengetriebe fur Personenkraftwagenn mit dem hydrodynamischen Drehmomentwandler in Leistungsverzweigung"; Automobil Industrie, Nr. 1, 1985, Seiten 597–602.

W. Klement "Die Entwicklung der Voith–DIWA–Getriebe", Verkehr Und Technik, De, Eric Schmidt Verlag, Bielefeld, Bd. 40, Nr. 7, 1987, Seiten 301–303.

* cited by examiner

Primary Examiner—P. W. Echols
(74) Attorney, Agent, or Firm—Baker & Daniels

(57) ABSTRACT

A process for the assembling of a gear component having a gear housing which has a substantially cylindrical interior space for the reception of individual gear elements; at least two bar-form guide elements which, as viewed in an axial direction, extend over and are adjacent to at least a part of the axial extent of the cylindrical interior space and on which there are mounted a gear element. The bar-form guide elements are adjacent to the cylindrical interior space and outside of the zone having the greatest dimensions of the cylindrical interior space in the height direction. The individual gear elements are threaded successively from one housing end onto the guide elements and are slid into their installation position in the gear housing.

4 Claims, 3 Drawing Sheets

Figure 1A:
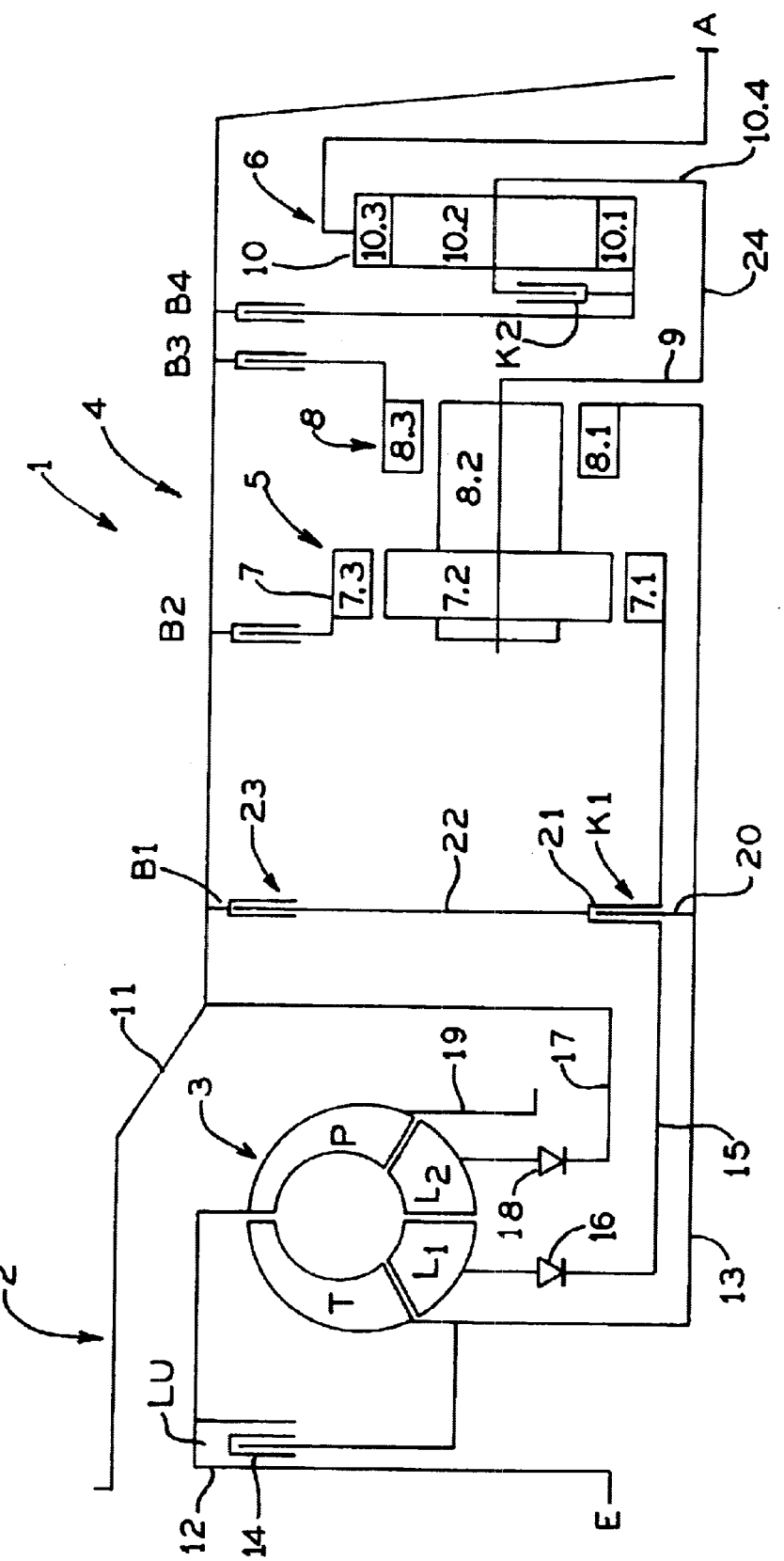

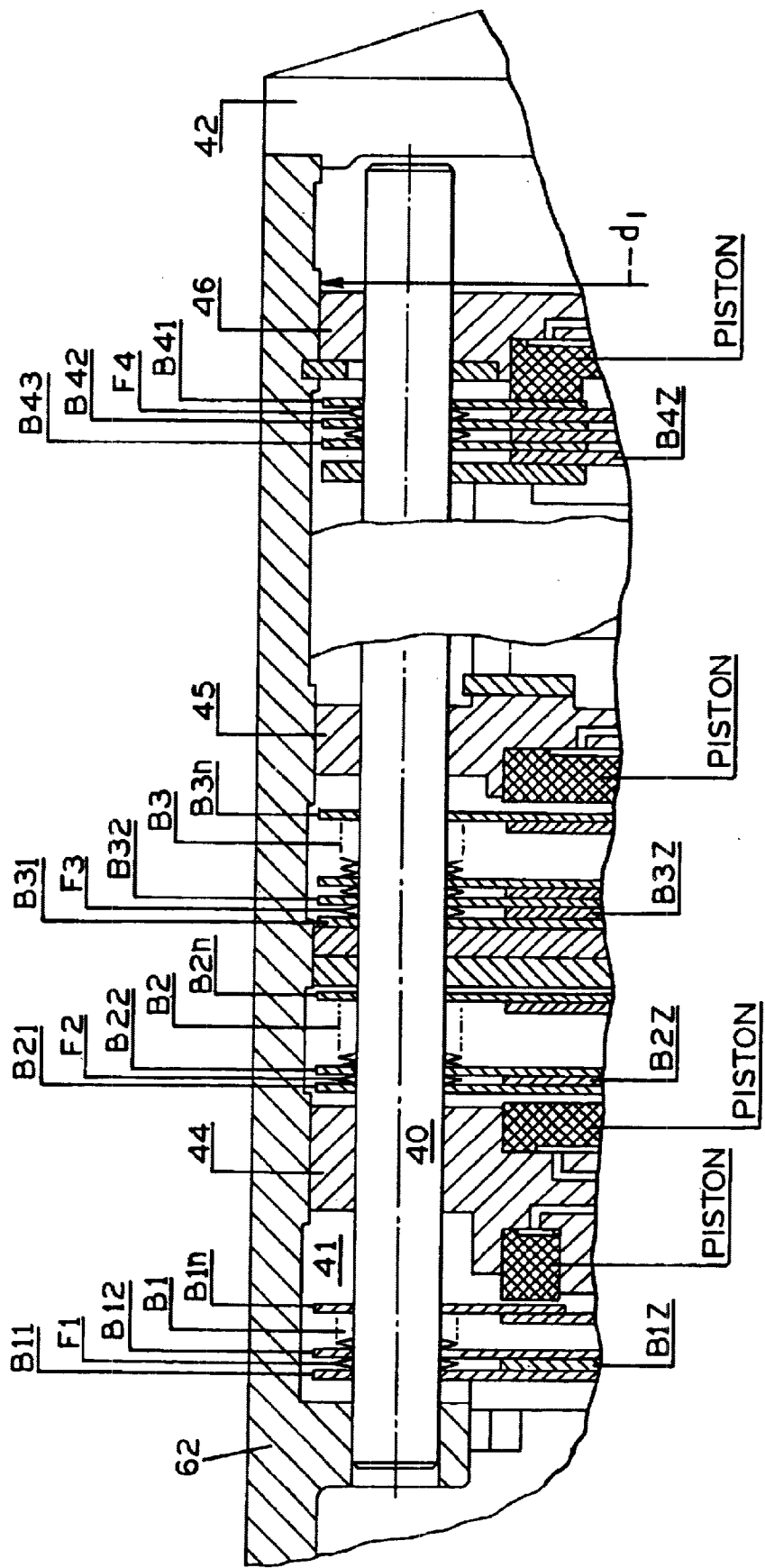
FIG. 1b  SECTION A-A

METHOD FOR MOUNTING A TRANSMISSION UNIT

The invention relates to a process for the assembling of a gear unit, in particular one with the features from the generic term of claim 1.

Gear units are known in a large number of executions. These can be executed as a) mechanical gear units b) hydrodynamic-mechanical compound gear units.

Hydrodynamic-mechanical compound gear units are known, for example, from the following publications;

Buksch, M: ZF-five gear automatic gear systems for passenger automobiles, VDI report 878 (1991@

Nitescu, G.: Four-gear planetary gear for passenger motor vehicles with the hydrodynamic torque converter in the power branching, Automobilindustrie (1985) 5, pages 597–601

Klement, W.: The development of the DIWA gear system, Verkehr und Technik (1987) 7, pages 301–303

The gear construction units which have either only purely mechanical transmission components or else consist of a combination of a hydrodynamic converter or of a hydrodynamic coupling with a downstream mechanical gear set have as a rule a housing which is adapted, in respect to its inner contour, to the formation and tying of the individual gear elements onto the housing, and have, as a rule, inner insets which undesirably reduce the inside diameter. For example, one gear system obtainable on the market uses a threading on six rods or bars distributed at equal intervals about the circumference of the inner contour, with the aim of a very simple assembling of the components or gear elements. The individual rods ensure the gear elements against twisting in circumferential direction. The arrangement of the six bars, as viewed in circumferential direction of the gear unit, with constant spacing between two adjacent bars, as well as the number of these bars, however, considerably reduce the inside diameter of the gear since essentially the upper has in installation position reduce the construction height and therewith the possibly usable planetary diameter. The gear interior space, with respect to the present outside dimensions of the gear, cannot be used optimally for the gear elements. From the publication U.S. Pat. No. 3,475,992 there is known an execution of a compound gear component, in which individual elements, for example the pump execution, the input shaft, are preassembled outside of the gear housing and then installed from the left into the housing. The remaining gear components, such as distributor gear, bridging coupling, planetary wheel gear are then introduced individually into the housing from the right side of the housing. Some of the elements, such as braking elements, couplings, are borne there on guide elements, and these guide elements in correspondence to the introduction from the left or the right side are executed in several parts and corresponding partitions are borne between them. Also, the guide elements are supported on the end zones of the housing, i.e. on the housing cover. This means that with corresponding bearing of actuating elements axial forces are transferrable onto the housing cover, for which reason the gear component cannot be separately tested in advance without the housing cover.

Underlying the invention, therefore, is the problem of creating a process for the assembling of a gear component in which, besides a simple assembling, it is also ensured that with external prescribed installation dimensions there can be achieved as great as possible an inside diameter of the gear component. Further, emphasis is to be placed on a reduction of the constructive and manufacturing technical expenditure as well as on a minimizing of the requisite number of parts.

The solution of the problem according to the invention is characterized by the features of claim 1. Advantageous developments are described in the subclaims.

The gear component, which comprises a gear housing and a substantially cylindrical interior space, has at least two bar-form elements for the tying-on of gear elements either in radial direction or in circumferential direction. The bar-form guide elements extend there essentially over a range in which the gear elements provided for the typing-on are arranged. The bar-form guide elements are allocated to the cylindrical interior space and arranged in a zone outside of this, the allocation taking place in such manner that the bar-form guide elements are provided outside of a zone which, as viewed in installation position of the gear system, corresponds to the greatest dimension of the interior space of the gear unit, in height direction. According to the invention the individual gear elements are threaded successively from one housing side onto the guide elements and brought into their installation position in the gear housing.

Preferably none of the guide elements is arranged in installation position above the greatest dimensioning in height direction of the interior space in the gear housing, but in the formerly material-intensive zones of the gear housing with substantial quadrilateral gear exterior contour with cylindrical inner space.

With the solution according to the invention accordingly the inside diameter or the inside contour of the gear housing can be made appreciably larger with installation measurements that remain the same for the gear unit and (sc. the space needed for) the assembling, as well as the interchangeability of the individual gear elements in axial direction can be reduced. Through the guidance of the bar-form guide elements in the recesses that are connected with the cylindrical interior space the cylindrical inner space can be completely used by the gear elements in respect to their radial extent. For example with the execution of the gear elements as a lamellar coupling, the area describable by the cross section surface of the interior space can be used completely as a friction surface. Since the bar-form guide elements do not collide with the interior space, also the other rotating gear elements, for example planetary wheel sets, can be designed in such manner that the entire interior space is completely utilized in radial direction. This leads to the result that through the diameter increase with equal construction length a greater torque can be transmitted. It is possible to dispense with additional interior insets for the bearing, which reduce the diameter of the interior space. The suspension on the bar-form guide elements prevents twisting of the individual gear elements in circumferential direction.

Compulsorily required for the guidance are only two bar-form elements; there are required at most four and preferably four bar-form guide elements are used. The arrangement occurs in this case, as viewed in the cross section of the gear housing, in the corner zones, which (cross section) is describable by the section size between the cylindrical interior space and a theoretically generatable quadrilateral, preferably the quadrate $Q_{theoretic}$ with a side dimension greater or equal to the diameter of the interior space, the theoretically generatable quadrate $Q_{theoretic}$ and the interior space having identical axes of symmetry. In this case especially with a rectangular housing with cylindrical interior space the material-intensive corner zones are used for the reception of the guide elements. The guide elements there are conducted in recesses which are connected with the cylindrical interior space. Preferably, however, the arrangement of the guide elements always occurs symmetrically. This offers the advantage that the manufacturing expenditure for the gear elements and the gear housing can be minimized as can also the assembling expenditure, since it is not necessary to heed how the individual recesses or the passage openings on the gear elements must be formed for the reception of the guide elements. Also the housing base body with the recesses can be manufactured independently from the later actual installation position.

As gear elements there can be regarded, for example, braking arrangements in the form of lamellar brakes, partitions, actuating elements for braking or coupling arrangements, for example in the form of pistons, lamellae carriers or the like.

The bar-form elements preferably have an equal or constant diameter over their axial extent. This offers the advantage that the assembling can occur independently from the installation direction of the bar-form elements. Also thinkable, however, depending on the formation of the total gear unit, is the use of bar-form elements with a different diameter over the axial extent. In this, however, as a rule there will occur an assembling from two sides.

By bar-form elements there are meant there guide elements the profile of which is constructed as a solid or hollow profile, or a combination of the two.

The guide elements, further, according to their tying-on, can function as a shaft or as an axle.

It is also conceivable, for example, to execute a guide Element as a hollow axle, which encloses, for example, a shaft for the drive of accessory aggregates, or an axle.

The cross section of the bar-form guide elements is preferably circular. Also thinkable, however, are executions with quadrilateral cross section or arbitrary cross section.

In regard to the bearing of the bar-form guide elements the following variants can be used:
 a) Bearing on the housing in housing wall projections
 b) Bearing in partitions which are threaded onto the guide elements
 c) Suspended bearing on a wall projection or a partition, for example on the face sides of the gear unit, for example over covers
 d) Bearing over wall projections (lugs)
 e) Combination of a)–d)

The gear unit can be constructed as a purely mechanical gear unit. In this case each bar-form guide element extends preferably over the entire axial extent of the gear unit. In the execution of the gear unit as a hydrodynamic-mechanical compound gear system, the bar-form guide elements is provided at least with an axial length which corresponds to the axial extent of the mechanical gear part with respect to the total gear component. It is always required, however, that the axial extent of the guide elements corresponds to the axial extent of the gear elements supported on these.

A further possibility for the bearing of the bar-form elements lies in using the housing cover. In the especially preferred forms of execution, however, this possibility is dispensed with.

In an especially preferred gear component also devices are led for the resetting of actuating elements of the lamellar braking and/or coupling arrangements, and through the bar-form guide elements. Between the two friction surface-carrying elements which are indirectly couplable with one another over a friction surface-carrying intermediate element, there is provided at least one spring storage arrangement which is likewise led over the bar-form guide element and is laid out in such manner that on generation of the friction closure between the friction surface-carrying elements and the intermediate element the spring storage arrangement is pretensionable. By friction surface-carrying elements there are meant there the elements which are couplable with one another over an intermediate element. In each case a friction surface-carrying element and a friction surface-carrying intermediate element form, on pressing-on, a friction surface pair. By friction surface there is meant there the surface or the surface-zone which is involved in the friction closure. The friction surface there can be a component of the friction surface-carrying element or of the intermediate element, or be allocated to this as a separate element, for example in the form of a coating. The friction surface or the surface zones functioning as friction surface of a friction surface-carrying element or of an intermediate element can be generated, further, by coating or surface treatment. The function of the friction surface-carrying elements can be taken over there both from outer and also from the inner lamellae. By reason of the effect of the spring storage unit between the individual friction surface-carrying elements, the relaxation of the actuating element in each case an oppositely directed force, acts on the friction surface-carrying elements, so that a rapid separation with complete releasing of the friction closure becomes possible. The spring storage arrangement acts therefore indirectly on the actuating element, over the friction surface-carrying elements. The actuating element itself can be executed, for example, as a piston, which preferably can be acted upon hydraulically or pneumatically. This possibility of arranging the spring storage units between the friction surface-carrying elements offers the advantage that the dimensions of the friction surface-carrying elements in radial direction are no longer dependent on the size of the inner dimensions of the gear housing, with account taken of the requisite construction space for the device for the at least indirect resetting of actuating elements. The arrangement of spring storage units between the friction surface carrying elements connectable with one another by friction closure over an intermediate element, offers also the advantage of a space-saving execution of the resetting device, especially of the piston of a cylinder/piston unit in axial direction, which again affects the gear length in use of the braking arrangements in lamellar construction in a gear. In respect to the arrangement of the spring units between the friction surface-carrying elements, a large number of possibilities are thinkable:
 a) Arrangement of spring units between each of the two adjacent friction surface-carrying elements;
 b) Arrangement of the spring units in force flow direction between the friction surface-carrying elements in the region of the force introduction (in the region of the in each case outside-lying friction surface-carrying elements with respect to the installation position of the braking arrangement in a gear unit);
 c) Arrangement of the spring unit between two friction surface-carrying elements adjacent to one another in respect to the axial extent of the braking arrangement in the middle zone of this;
 d) Arrangement according to b) in combination with c);
 e) Arrangement of spring units in correspondence to the possibilities described in a) to d) in combination.

The possibilities described in b) to e) deal with executions in which a spring unit is not arranged between each friction surface pair bringable into engagement with one another. The force interruption can occur there at any point of the braking arrangements.

As spring storage units there are preferably used spring elements which have a characteristic curve with an essentially constant force flow over a certain spring path. Preferably, therefore, cup springs are used. The execution of the spring units as a shaft spring ring is likewise conceivable. The actuation arrangements used can be executed as cylinder/piston arrangements which can be acted upon hydraulically or pneumatically. In correspondence to the arrangement of the piston for the resetting device over the friction surface-carrying elements, there are especially effective lamellae on the piston, either in the zone of the piston surface or outside of the piston surface. In respect to the formation of the piston there are distinguished executions with a) one piston
b) plurality of pistons.

The appertaining cylinders can be formed there by a cylinder-carrying element or a plurality of cylinder-carrying elements. This possibility of piston resetting offers the advantage of a minimal construction space requirement in a radial as well as in an axial direction. In combination with the solution according@ to the invention there is given the possibility of creating a gear component with the possibility of high torque transfer with a constant-remaining structural height or a reduced structural height.

Figure 2:
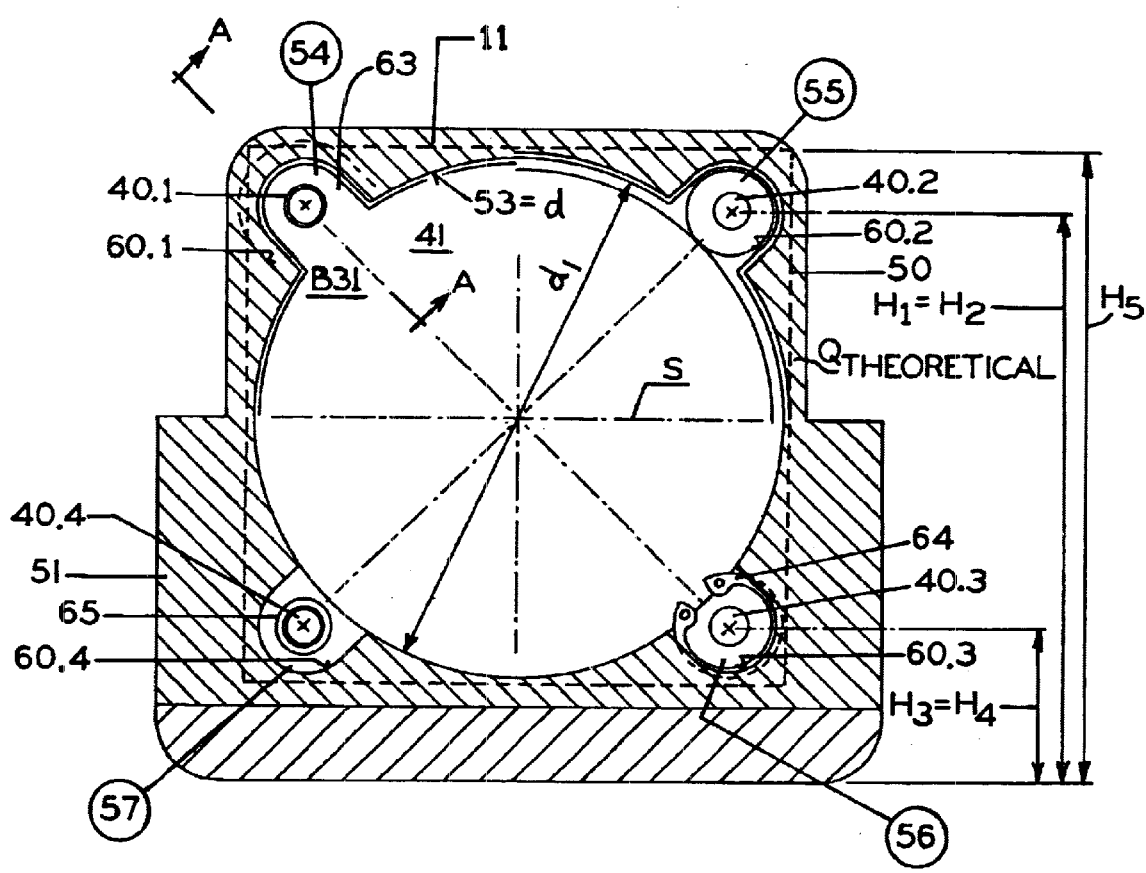

The solution according to the invention is explained in the following with the aid of figures. In these the following is represented:

FIG. 1a explains with the aid of a diagram the use in a special gear type;

FIG. 1b explains a construction execution for the schematic representation in FIG. 1a;

FIG. 2 shows a possible elevation view from the right of a gear type corresponding to FIG. 1.

FIG. 1 explains the solution according to the invention by way of example with the aid of a certain gear type in axial section. The gear unit is executed as a hydrodynamic-mechanical compound gear 1.

The hydrodynamic-mechanical compound gear 1 comprises a first hydrodynamic gear part 2 in the form of a hydrodynamic speed/torque converter 3 and a second mechanical gear part 4. The mechanical gear part 4 comprises a mechanical speed/torque converter 5 and a group set engaged downstream of this in force flow direction in traction operation. The mechanical speed/torque converter 5 is executed as a modified Ravigneaux planetary wheel set. This comprises a first planetary wheel set 7 and a second planetary wheel set 8, which have a planetary wheel carrier 9 used in common. This presents the coupling between a gear element of the first and of the second planetary wheel set. The first planetary wheel set 7 comprises a sun wheel 7.1, planetary wheels 7.2, and a hollow wheel 7.3. The second planetary wheel set 8 comprises a sun wheel 8.1, planetary wheels 8.2, and a hollow wheel 8.3.

The group set 6 comprises at least one planetary wheel set 10, which has a sun wheel 10.1, planetary wheels 10.2, a hollow wheel 10.3 and a web 10.4.

The hydrodynamic-mechanical speed/torque converter 3 comprises a turbine wheel T, a pump wheel P, a first guide wheel L1 and a second guide wheel L2 and is covered by a housing 11. The pump wheel P is connected with a gear input shaft E which is couplable at least indirectly with a drive engine serving for the drive, preferably with a flywheel 12 of an internal combustion engine in such manner that the force is transferred from the flywheel 12 onto the pump wheel P. The turbine wheel T is torsionally joined with a turbine wheel shaft 13. In order to use the advantages of the hydrodynanic torque transfer with bridging coupling, which in the following would be:

automatic stageless adjustment of the relation between the drive and offdrive speed corresponding to the load on the offdrive side Availability of the maximal torque for a starting process with high acceleration;

Possibility of heat lead off through outside or surface cooling

Separation of the hydrodynamic speed/torque converter from the offdrive, especially from the vehicle at low drive speeds, and transfer of a low residual torque, so that a choking of the drive machine from the offdrive side is not possible Wear-free power transfer and simultaneously to avoid the disadvantages of a hydrodynamic power transfer, which lies essentially in an often not sufficiently attainable efficiency, in order to work with a hydrodynamic gear alone since loss power constituents, which are composed of friction and impact losses, reduce the transferrable total power, and the transformation ranges achieved for the vehicle use are often insufficient, the hydrodynamic speed/torque converter 3 is used only in the lower gear stages, preferably only during the starting process, for the power transfer. For the improvement of the transfer efficiency degree, therefore, the hydrodynamic speed/torque converter 3 is taken out of the power transfer preferably by bridging. For this purpose there is arranged a bridging coupling 14 between the turbine wheel T and the flywheel 12 or the gear input shaft.

The first guide wheel L1 is arranged on the turbine side, between the turbine wheel T and the pump wheel P, and it is borne by a freewheeling element.

The first guide wheel L1 is torsionally connectable with a first guide wheel shaft 15, there being provided between the first guide wheel L1 and the guide wheel shaft 15 a freewheeling 16, which is designed in such manner that it transfers a torque onto the first guide wheel shaft 15 when the first guide wheel L1 rotates in reverse direction, i.e. in a direction opposite the rotation direction of the turbine wheel T, and which runs without load when the first guide wheel L1 rotates in normal direction, i.e. in the same direction of rotation as the turbine wheel T. The second guide wheel L2 is arranged between the turbine wheel T and the pump wheel P on the pump side and is couplable over a second guide wheel shaft 17 with the housing 11. Between the second guide wheel L2 and the second guide wheel shaft 17 there is arranged a freewheeling 18, by means of which the second guide wheel L2 can be coupled with the second guide wheel shaft 17, but only if the second guide wheel L2 rotates in a direction opposite that of the turbine wheel T. The pump wheel P is torsionally (untwistably) joined with a pump wheel shaft 19 which is borne turnably over a bearing in the housing 11. The pump wheel P is torsionally (untwistably) joined with a pump wheel shaft 19 which is borne turnably over a bearing in the housing 11. The pump wheel P is torsionally (untwistably) joined with a pump wheel shaft 19 which is borne turnably over a bearing in the housing 11.

The pump wheel P is torsionally (untwistably) joined with a pump wheel shaft 19 which is borne turnably over a bearing in the housing 11.

For the realization of the individual gear stages and the layout of the individual gears, to the individual elements of the hydrodynamic-mechanical compound gear 1 switching elements are allocated. Between the hydrodynamic gear part 2 and the mechanical gear part 4 there are provided a first coupling arrangement K1 and a first braking arrangement B1.

The turbine wheel T and the turbine wheel shaft 13 torsionally couplable with this, is coupled with the sun wheel 8.1 of the second planetary wheel set 8 of the mechanical speed/torque converter 5. Preferably the turbine wheel T and the sun wheel 8.1 of the second planetary wheel set 8 are arranged on a common shaft, here the turbine wheel shaft 13; the turbine wheel shaft 13 there carries also the coupling disk 20 of the first coupling K1. The first coupling K1 has, further, a coupling disk 21, which is coupled with the first guide wheel shaft 15. Furthermore, the first guide wheel L1 is connectable over a guide wheel shaft 15 with the sun wheel 7.1 of the first planetary wheel set 7 of the mechanical speed/torque converter 5. The coupling disk 21 is connected with the first guide wheel shaft 15. The first guide wheel shaft 15 is executed as a hollow shaft which encloses the guide wheel shaft 13 in circumferential direction.

With the coupling covering 21 of the first coupling K1 there is preferably connected a disk-form element 22 and it forms with this a structural unit on the outer circumference 23 of which the first braking arrangement B1 can engage. The first braking arrangement B1 serves there for the fixing into position of the first guide wheel L1 over the guide wheel shaft 15 and/or of the first sun wheel 7.1 of the first planetary wheel set 7 of the mechanical speed/torque converter 5. Further switching elements, here the switching elements in the form of braking arrangements B2 and B3, are allocated to the individual planetary wheel sets 7 and 8 of the mechanical speed/torque converter 5. In the case represented, the second braking element B2 is allocated to the hollow wheel 7.3 of the first planetary wheel set 7, and the third braking element B3 is allocated to the hollow wheel 8.3 of the second planetary wheel set 8 of the mechanical speed/torque converter 5. The coupling of the mechanical speed/torque converter 5 with the gear input shaft E over the hydrodynamic speed/torque converter 3 or its bridging over the bridging coupling 14 occurs, there, by coupling of the turbine wheel T or the turbine wheel shaft 13 with a first gear element of the mechanical speed/torque converter 5, and that of the first guide wheel L1 with a further second gear element of the mechanical speed/torque converter 5. As first gear element of the mechanical speed/torque converter 5 there functions here the sun wheel 8.1 of the second planetary wheel set 8. As second gear element there functions the sun wheel 7.1 of the first planetary wheel set 7. The shafts coupled with the two sun wheels 7.1 and 8.1, here the first guide wheel shaft 15 and the turbine wheel shaft 13, function as input shafts of the mechanical speed/torque converter 5. A further third gear element is connected with the gear output shaft A over the group set 6. As third gear element there functions the planetary carrier 9, which is used in common by both planetary wheel sets 7 and 8. The third gear element of the mechanical speed/torque converter 5 is connected with the input which is formed by a first gear element of the group set 6. Preferably this connection is realized over a torsional coupling of the third gear element of the mechanical speed/torque converter 5, and first gear element of the group set 6. Both are arranged preferably on a common connecting shaft 24. The first gear element of the group set 6 is formed by its planetary carrier 10.4. A second gear element of the group set 6 is connected torsionally with the gear output shaft A of the hydrodynamic-mechanical compound gear 1. As second gear element there functions, in the case represented, the hollow wheel 10.3 of the planetary wheel set 10 of the group set 6. While the mechanical speed/torque converter 5 in combination with the hydrodynamic speed/torque converter 3 serves for the execution of three gear stages, it is possible in the represented case, by the combination of the hydrodynamic speed/torque converter 3, of the mechanical speed/torque converter 5, with the group set 6, to execute six gear stages. For this purpose to the group set 6 there are allocated in each case a further coupling arrangement, here the second coupling arrangement K2, and a further braking arrangement, here the fourth braking arrangement B4. The fourth braking element serves there for the fixing into position of the sun wheel 10.1 of the group set 6. The second coupling arrangement K2 makes possible the rigid coupling between the planetary carrier 10.4 and the sun wheel 10.1 of the planetary wheel set 10 of the group set 6.

From the cutout presented in FIG. 1b from a possible axial section of the gear component 1 it becomes evident how individual gear elements which are fastened or borne on the housing are fastened in the manner of the invention to the housing 11. The individual braking arrangements B1 to B4 are executed in lamellar construction type. These comprise at least in each case two friction surface-carrying elements which are joined with one another with frictional closure over a friction surface-carrying intermediate element. In the form of execution represented, the friction surface-carrying elements are designated as follows for the individual braking arrangements:

$B_1: B_{11}, B_{12}, B_{1n}$
$B_2: B_{21}, B_{22}, B_{2n}$
$B_3: B_{3k}, B_{32}, B_{3n}$
$B_4: B_{41}, B_{42}, B_{4n}$

The intermediate elements are designated in each case with $B_{12}$, $B_{22}$, $B_{32}$ and $B_{42}$. The friction coatings can be fastened in general either to the inner lamella or to the outer lamella. In the case represented these are provided, for example, on the outer lamellae. The friction surface-carrying elements $B_{1n}$ to $B_{4n}$ form there the outer lamellae. The locally fixed establishment of the outer lamellae occurs there over the bar-form guide elements 40. These extend preferably at least over the axial extent of the mechanical gear part 4. The housing 11 has in this section a constant inside diameter $d_1$ over the axial extent. Preferably, as represented in FIG. 2, four bar-form guide elements 40.1 to 40.4 are provided, which are arranged in the gear housing 11, for example, with constant-remaining spacing to one another in circumferential direction. The gear housing 11 itself, at least in the zone which receives the mechanical gear part 4, is constructed in such manner that this has an essentially cylindrical inner cross section. Preferably the gear housing, as viewed in axial direction, has an essentially constant inside diameter in the zone of the mechanical gear part 4. The inside diameter is designed in such manner that essentially the rotating gear elements and structural parts can rotate freely, with utilization of the maximally possible construction space. The individual guide element 40 is preferably made in one piece, but it can also consist of several sections. In the unassembled state of the mechanical gear part 4 the interior space, which is designated here with 41, is substantially empty. For the assembling, first the bar-form guide elements are brought into the corresponding positions, or suspended in a corresponding manner on the gear housing, and the individual gear elements are threaded successively in correspondence to the desired arrangement on these guide elements. All the components of the mechanical gear part can be threaded successively from the separating point T to the housing cover 42 in the assembling.

This offers the advantage that with the threading-on technique and the constant inner diameter the individual components in the mechanical gear part 4 can be interchanged among one another, and accordingly in a simple manner with gear housing remaining the same or with the same dimensions of the gear component, middle offdrives or all wheel offdrives can be constructed. The assembling occurs only from one side and, namely, in the case represented from the side of the cover 42. The assembling takes on a simple form and can be executed within the shortest possible time. The individual planetary wheel sets can be interchanged among one another in respect to their arrangement. Further, different variant offdrives are realizable.

The axial fixing into position of the individual gear elements occurs there by security means, for example in the form of security rings or stops. Besides the outer lamellae there are also conducted so-called partitions 44, 45, 46 and 47. Furthermore, there occurs likewise over the guide elements 40.1 to 40.4 the fixed arrangement or supporting of gear elements, for example lamellae carriers of the like.

FIG. 2 explains a cross section corresponding to a view A—A according to FIG. 1. There is evident the gear housing 11, which in the case represented can be subdivided into two partial zones 50 and 51. The first partial zone 50 forms there the upper housing part in installation position, the second partial zone 51, the housing part arranged underneath the gear symmetry axis S in installation position. The gear housing 11 has, as already explained in the statements for FIG. 1, a substantially cylindrical inner contour 53, which encloses an interior space 41. The inner contour 53 can be described by the diameter $d_1$. This extends, as already thoroughly explained with respect to FIG. 1, essentially over the entire axial extent of the mechanical gear part 4. Means are assigned for the reception and tying-on of the gear elements in radial direction and for the securing against twisting in circumferential direction. These means are formed by the guide elements 40.1 to 40.4. These are allocated to the inner circumference 53 described by the diameter $d_1$ in such manner that these are arranged in installation position of the gear component 1 at a height H1 to H4, which in respect to the dimensions is less than the dimension H5 described by the maximal extent of the inner contour 53 in installation position in height direction. The guide elements, therefore, as explained in FIG. 2, are arranged in the comer zones 54, 55, 56 and 57 of the housing 11, it being possible to describe the comer zones by an allocation of a quadrate or rectangle to the inner contour 5. The comer zones 54 to 57 are described there in installation position allocation of the quadrate $Q_{theoretic}$ in which the diameter $d_1$ circumscribed by the inner contour 53 is arranged in the quadrate, and both, the quadrate $Q_{theoretic}$ drawn upon theoretically for observation as well as the inside diameter d of the inner contour of the housing, have the same symmetrical axes S1 and S2. For the reception of the guide elements corresponding recesses are provided in the housing. These are designated here for the individual guide elements in each case with 60.1 to 60.4. The arrangement of these recesses 60.1 to 60.4 in the housing occurs there outside of a zone on the gear housing which is described by the maximal extent of the inner contour from the respective axis of symmetry in height or width direction of the gear component. This means that with use of an essentially rectangular housing outer form and an essentially cylindrical housing inner contour 53 there are used only the material-intensive corner zones 54 to 57 of the housing 11 for the reception of the guide elements 40.1 to 40.4. Additional construction space in height and width direction is not needed. The interior space 41 can be formed with the maximally possible diameter $d_1$, since in height and width direction no additional construction space has to be provided for the tying-on of the gear elements. The gear housing 11 itself can be equipped with a relatively thin housing wall in the zones free from the incorporated recesses 60.1 to 60.4. The recesses 60.1 to 60.3 form so-called engagement pockets into which the guide elements 40.1 to 40.4 can be inserted. Preferably there is provided in each case in axial direction, as clarified there is provided in each case in axial direction, as clarified in FIG. 1, a possibility for the suspending or for the suspension bearing of the guide elements 40.1 to 40.4. In FIG. 1 this is designated with 62. In addition, the guide elements can also be conducted in the partitions which extend in radial direction over the entire interior space. FIG. 2 explains, for example, the tying-on of the friction surface carrying element $B_{31}$. For the tying-on to the guide elements 40.1 to 40.4 there are represented in FIG. 2 four possible variant executions, schematically simplified. Preferably for the axial fixing into position of an element there are used equal axial security elements. On the guide element 40.1 the axial securing occurs by use of shim plates, in the guide element 40.3 by means of a security ring 64, and on the guide element 40.4 by sleeves 65. For the threading of the individual gear elements onto the bar-form guide elements 40.1 to 40.4, these have corresponding passage openings. Preferably the gear elements are executed in such manner that these have, in addition to their circular cross section, projections 63 on which there are made the recesses and passage openings, respectively. This offers the advantage that remaining construction space, especially the cylindrical inner space 41, can be used substantially fully and can contain no additional troublesome elements. Especially in tying-on of the outer lamellae corresponding to FIG. 2 there can be used for the force transfer a surface which corresponds essentially to the surface describable by the inside diameter $d_1$.

Preferably the tying-on of the gear elements takes place in all four possible comer zones 54 to 57. The guide elements 40.1 to 40.4 and the corresponding projections on the gear elements are correspondingly arranged with constant spacing, as viewed in circumferential direction, on the inner contour 53 of the gear component 1. There is also the possibility, however, of finding a substantially symmetrical arrangement which differs from the arrangement in the comer zone. Further, it is not compulsively necessary to perform a tying-on in all four comer zones. For the twist security in circumferential direction at least two guide elements are required.

Preferably the braking arrangements B1 to B4 are equipped with a device for the resetting of actuating elements. For this purpose there is provided in each case, between two friction surface-carrying elements adjacent to one another, a spring storage element, which is likewise guided by the guide elements corresponding to the guide element 40.1, seen in FIG. 1, and on generation of the frictional closure is pretensionable between the friction surface-carrying elements and the intermediate elements. In the case represented there are provided between the friction surface-carrying elements of the braking arrangement B1 a spring storage unit F1 or B2, F2, B3-Fe and Be, Fe. The spring storage units are arranged there always outside of the friction surface-carrying elements, so that in this respect no collision of any kind can arise between the spring storage units and the friction surface-carrying elements. Preferably, corresponding spring storage units are arranged at least between the first two friction surface-carrying elements of a braking arrangement adjoining one another in force flow direction. This form of execution offers the advantage that by reason of the effect of the spring storage unit, between the individual friction surface-carrying there act on these in each case oppositely directed forces, so that a rapid separation becomes possible, with complete release of the frictional closure. The spring storage arrangement acts, therefore, at least indirectly over the friction surface-carrying elements on the actuating element, in particular a piston. The actuating elements, i.e. the pistons, can be acted upon for example hydraulically or pneumatically. The individual friction surface-carrying elements then no longer have to slide free. There always occurs a compulsory separation, at least in the zone in which the spring storage unit is arranged.

The arrangement of the spring storage units between the individual friction surface-carrying elements offers, further, the advantage that the dimensions of the friction surface-carrying elements in radial direction is no longer dependent on the size of the inner dimensions of the gear housing with account taken of the requisite construction space for the device for the at least indirect resetting of actuating elements. The arrangement of spring storage units between the friction surface-carrying elements connectable with one another with frictional closure over an intermediate element offers, further, the advantage of a space-saving execution of the resetting device in axial direction, which again has a positive effect on the gear construction length.

The solution according to the invention is not restricted to one gear type as described in FIG. 1, but presents for this type of gears an especially advantageous possibility of assembling, which, also by reason of the interchangeability of individual gear elements as seen in axial direction, results in a universal usability of a certain basic gear type.

What is claimed is:

1. A process for the assembly of a gear component having a gear housing which includes an essentially cylindrical interior space for the reception of individual gear elements, at least two bar-form guide elements extending axially over at least a part of the axial extent of the housing interior space, the bar-form guide elements fixing the position with respect to the housing of a plurality of gear elements, the bar-form guide elements disposed in a space outside of the cylindrical interior space but connected with the cylindrical interior space, said guide elements being within the height dimension defined by the diameter of the cylindrical space as viewed when oriented for installation, said process comprising:

threading each of the plurality of gear elements successively, from one housing end, onto at least two of the guide elements; and sliding each individual gear element along the guide elements and into each individual gear element's respective installation position in the gear housing.

2. The process according to claim 1, further comprising securing the plurality of gear elements of the gear component against shifting in an axial direction.

3. The process according to claim 1, comprising threading the plurality of gear elements successively onto four bar-form elements which are arranged in corner zones of the gear housing, said corner zones defined by the portion between the cylindrical interior space and a theoretically constructable quadrate having a side dimension greater than or equal to the diameter of the cylindrical interior space, said theoretically constructable quadrate and the cylindrical interior space having identical axes of symmetry.

4. The process according to claim 2, comprising threading the plurality of gear elements successively onto four bar-form elements which are arranged in corner zones of the gear housing, said corner zones defined by the portion between the cylindrical interior space and a theoretically constructable quadrate having a side dimension greater than or equal to the diameter of the cylindrical interior space, said theoretically constructable quadrate and the cylindrical interior space having identical axes of symmetry.

* * * * *